(12) United States Patent
Fang et al.

(10) Patent No.: US 10,903,750 B2
(45) Date of Patent: Jan. 26, 2021

(54) RESONANT SWITCHING CONVERTER

(71) Applicant: Silergy Semiconductor Technology (Hangzhou) LTD, Hangzhou (CN)

(72) Inventors: Chiqing Fang, Hangzhou (CN); Kaiwei Yao, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/559,828

(22) Filed: Sep. 4, 2019

(65) Prior Publication Data

US 2020/0091829 A1    Mar. 19, 2020

(30) Foreign Application Priority Data

Sep. 19, 2018   (CN) .......................... 2018 1 1093338

(51) Int. Cl.
  *H02M 3/335* (2006.01)
  *H02M 1/00* (2006.01)
(52) U.S. Cl.
  CPC .................. *H02M 3/33569* (2013.01); *H02M 2001/0058* (2013.01)
(58) Field of Classification Search
  CPC ......... H02M 3/33576; H02M 3/33507; H02M 2007/4815; H02M 2007/4822; H02M 3/33569; H02M 2001/0058
  See application file for complete search history.

(56) References Cited

U.S. PATENT DOCUMENTS

| | | | |
|---|---|---|---|
| 8,581,518 B2 | 11/2013 | Kuang et al. |
| 2011/0127925 A1 | 6/2011 | Huang et al. |
| 2017/0318639 A1 | 11/2017 | Wang et al. |
| 2018/0295685 A1 | 10/2018 | Wang et al. |
| 2018/0295690 A1 | 10/2018 | Chen et al. |
| 2018/0310376 A1 | 10/2018 | Huang et al. |

OTHER PUBLICATIONS

Tanaka et al., A DC power supply using flying-capacitor three-level PFC and LLC resonant three-level DC/DC converter for wide input-voltage Range and Multi Output, Jul. 25, 2017,IEEE, IFEEC 2017—ECCE Asia, 517-521 (Year: 2017).*

* cited by examiner

*Primary Examiner* — Jue Zhang
(74) *Attorney, Agent, or Firm* — Michael C. Stephens, Jr.

(57) ABSTRACT

A resonant switching converter can include: a voltage switching circuit configured to receive a first input voltage, and to generate a second input voltage of a resonant branch coupled to the voltage switching circuit; where when the voltage switching circuit is in a first operating state, the second input voltage provided to the resonant branch is less than the first input voltage; and where when the voltage switching circuit is in a second operating state, the input voltage provided to the resonant branch is zero.

20 Claims, 9 Drawing Sheets

RESONANT SWITCHING CONVERTER

RELATED APPLICATIONS

This application claims the benefit of Chinese Patent Application No. 2.01811093338.0, filed on Sep. 19, 2018, which is incorporated herein by reference in its entirety.

FIELD OF THE INVENTION

The present invention generally relates to the field of power electronics, and more particularly to resonant switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
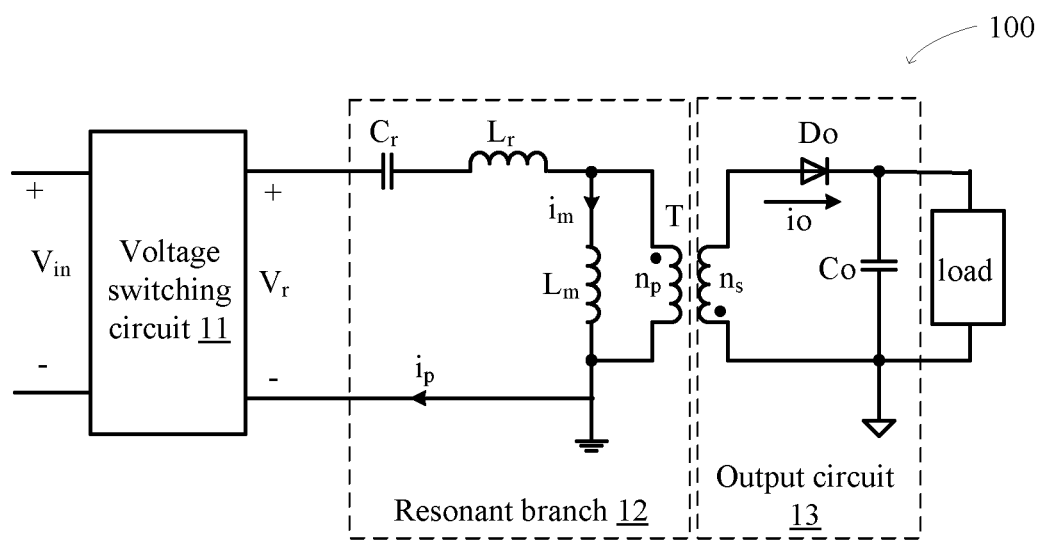
FIG. 1 is shown a schematic block diagram of a first example resonant switching converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

With the development of power electronics, switching converters have become more and more widely used. Correspondingly, the design of switching converters is also facing more and more challenges, including comprehensive performance requirements of high power density, high efficiency, fast speed and dynamic characteristics, and so on. In order to achieve higher power density, the approach of increasing the switching frequency is generally utilized to reduce the capacitance and the volume of magnetic components, such as transformers and inductors, but the increase of the switching frequency leads to an increase in switching loss, thereby reducing the efficiency of the switching converter.

Soft switching technology is one approach for the switching converter to achieve high frequency operation. Using the principle of resonance, the current or voltage of the power devices in the switching converter varies with the quasi-sinusoidal law, thereby realizing soft switching, and solving potential problems of hard switching loss in the hard switching converter, capacitive conduction, inductive shutdown, reverse diode recovery, and electromagnetic interference (EMI), that may be caused by hard switching. Isolated converters (e.g., flyback converters, forward converters, half-bridge converters, etc.) can realize soft switching by use of quasi-resonant, but potential drawbacks of this approach can include large stresses of the power devices, large power losses, low power density caused by limitation of the switching frequency, and large turns ratio and volume of the transformer.

In one embodiment, a resonant switching converter can include: (i) a voltage switching circuit configured to receive a first input voltage, and to generate a second input voltage of a resonant branch coupled to the voltage switching circuit; (ii) where when the voltage switching circuit is in a first operating state, the second input voltage provided to the resonant branch is less than the first input voltage; and (iii) where when the voltage switching circuit is in a second operating state, the input voltage provided to the resonant branch is zero.

Referring now to FIG. 1, shown is a schematic block diagram of a first example resonant switching converter, in accordance with embodiments of the present invention. As shown in FIG. 1A, resonant switching converter 100 can include voltage switching circuit 11, resonant branch 12 and output circuit 13. Voltage switching circuit 11 can receive input voltage $V_{in}$, and may generate input voltage $V_r$ having at least two different values. Resonant branch 12 can be coupled to voltage switching circuit 11, and may receive input voltage $V_r$. Voltage switching circuit 11 may have at least two operating states during each switching cycle. In a first operating state, voltage switching circuit 11 can control input voltage $V_r$ of resonant branch 12 to be not greater than input voltage $V_{in}$. In a second operating state, voltage switching circuit 11 can control input voltage $V_r$ of resonant branch 12 to be zero.

In this example, voltage switching circuit 11 can include at least two power transistors. A resonant tank of the resonant switching converter can be formed with resonant branch 12 and at least one power transistor in voltage switching circuit 11, in order to achieve resonant control. Output circuit 13 may be coupled to resonant branch 12 to receive the energy transferred by the resonant tank, and may accordingly generate an output electrical signal to drive a load. In this particular example, a flyback converter topology is employed. Resonant branch 12 can include resonant capacitor $C_r$, resonant inductor $L_r$, magnetize inductance $L_m$, and primary winding $n_p$ of transformer T connected in series between two terminals of input voltage $V_r$. Output circuit 13 can include series-connected secondary winding ns of transformer T, freewheeling diode Do and output capacitor Co. It should be understood that the actual transformer can be equivalent to a combination of leakage inductance, magnetize inductance and ideal transformer. In some applications, the leakage inductance can be used as a resonant inductance. As another example, resonant inductor $L_r$ may be the leakage inductance of the transformer, or it may be a separate inductor or a combination of a separate inductor and the leakage inductance of the transformer.

During the operating process, the value of input voltage $V_r$ can vary alternately according to application requirements, and may be maintained at a value not greater than input voltage $V_{in}$. In switching cycle T, when the value of input voltage $V_r$ is not zero and not greater than input voltage $V_{in}$, magnetic inductor current $i_m$ and primary winding current $i_p$ can increase linearly, and the values of both can be equal. Further, no energy may transmitted to output circuit 13, and freewheeling diode Do may have no current flowing therethrough. When the value of input voltage $V_r$ is switched to zero, magnetic inductor current $i_m$ may decrease linearly, primary winding current $i_p$ may be a resonant current, and the difference between magnetic inductor current $i_m$ and primary winding current $i_p$ can be transmitted to output circuit 13 though secondary winding $n_s$, such that current io may flow through freewheeling diode Do. Repeatedly, as the value of input voltage $V_r$ is switched, the values of magnetic inductor current $i_m$ and primary winding current $i_p$ can be cyclically switched, and output circuit 13 may generate a corresponding output electrical signal.

In particular embodiments, the resonant branch can multiplex at least one power transistor in the voltage switching circuit as a main power switch or an auxiliary power switch, which can form the resonant tank with the resonant branch including resonant elements. Moreover, the voltage stress of the power transistor can be reduced by the voltage switching circuit for converting the input voltage of the resonant switching converter while realizing the resonance control, such that the transistor with lower performance parameter can be utilized. In addition, switching loss, and performance requirements of other devices in the circuit can be correspondingly reduced (e.g., turns ratio of the transformer, etc.), thereby reducing the size and cost of the system circuit. On the other hand, the multiple resonant tanks can transfer energy to the output circuit of the resonant switching converter. For example, at least one resonant tank can transmit energy to the output circuit at any time during the operating process, such that the ripple of the output circuit may be reduced, and the output voltage may be more stable.

In this example, voltage switching circuit 11 in the resonant switching converter can include: N half-bridge circuits coupled in series between two terminals of input voltage $V_{in}$, each of which can include two power transistors connected in series, (N−1) first capacitors connected between output terminals of the two adjacent half-bridge circuits, and (N−1) second capacitors connected between two input terminals of a corresponding one of the second to the Nth half-bridge circuits respectively, where N≥2. Resonant branch 12 can connect between two power terminals of the 2Nth power transistor. The input voltage of resonant branch 12 can be switched by controlling the switching state of the power transistors and the voltage division of the first and second capacitors. In addition, resonant branch 12 can multiplex the power transistors in voltage switching circuit 11, in order to achieve resonant control.

Figure 2A:
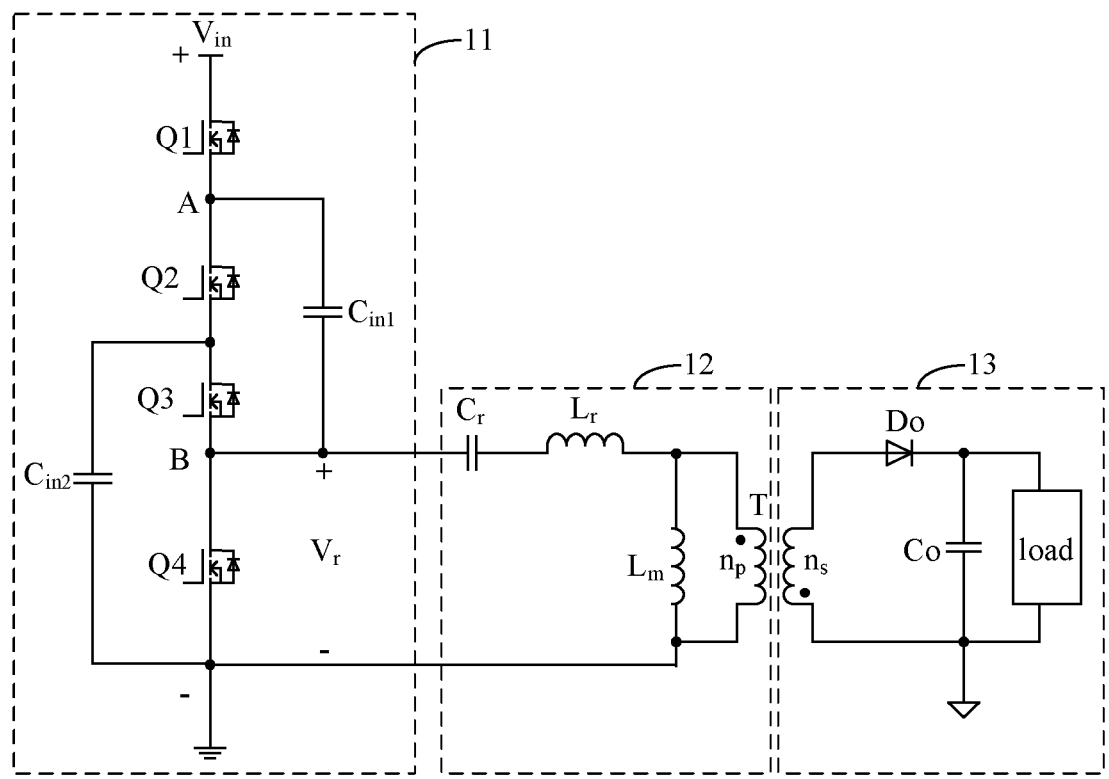
FIG. 2A is shown a schematic block diagram of a second example resonant switching converter, in accordance with embodiments of the present invention.

Referring now to FIG. 2A, shown is a schematic block diagram of a second example resonant switching converter, in accordance with an embodiment of the present invention. In this example, voltage switching circuit 11 can include a first half-bridge circuit including series-connected power transistors Q1 and Q2, and a second half-bridge circuit including series-connected power transistors second Q3 and Q4. The first and second half-bridge circuits can connect in series between two terminals of input voltage $V_{in}$. Resonant branch 12 can connect between two power terminals of power transistor Q4. Further, voltage switching circuit 11 can include capacitor $C_{in1}$ connected between output terminal A of the first half-bridge circuit and output terminal B of the second half-bridge circuit, and capacitor $C_{in2}$ connected between input terminals of the second half-bridge circuit.

Figure 2B:
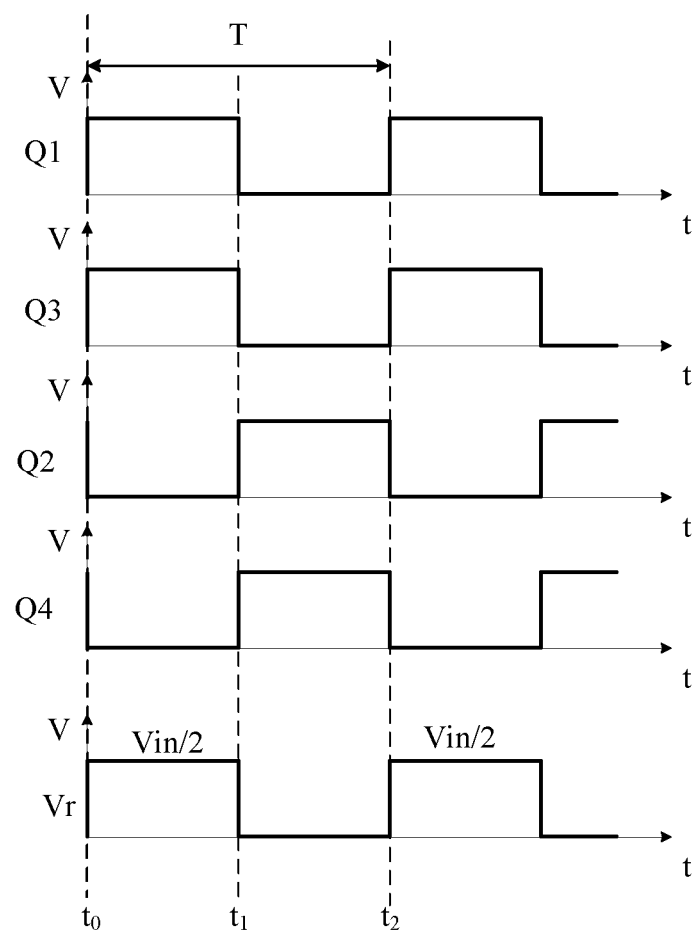
FIG. 2B is shown a waveform diagram of example operation of the resonant switching converter in FIG. 2A, in accordance with embodiments of the present invention.

Referring now to FIG. 2B, shown is a waveform diagram of example operation of the resonant switching circuit in FIG. 2A, in accordance with embodiments of the present invention. In each switching period T, the switching states of transistors Q1 and Q3 can be the same, the switching states of transistors Q2 and Q4 may be the same, and the switching states of transistors Q1 and Q2 can be complementary. In this particular example, in switching period T, voltage switching circuit 11 may have two operating states, namely time intervals $[t_0\text{-}t_1]$ and $[t_1\text{-}t_2]$, respectively. During time interval $t_0\text{-}t_1$, switching circuit 11 can operate in the first operating state, power transistors Q1 and Q3 may be turned on (e.g., at the same time), and power transistors Q2 and Q4 can be turned off, such that conduction paths are Vin-Q1-Cin1-Cr-Lr-Lm-ground terminal, and Cin2-Q3-Cr-Lm-ground terminal. Further, capacitor $C_{in1}$ can be in a charging state, capacitor $C_{in2}$ may be in a discharging state, and the input voltages of resonant branch 12 can be voltage Vin/2 across capacitor $C_{in2}$. In this way, magnetic inductor current $i_m$ and primary winding current $i_p$ may both increase linearly, and the values of both may be equal, such that transformer T can store energy, no energy may be transmitted to output circuit 13, and no current may flow through freewheeling diode Do.

During time interval $t_1\text{-}t_2$, switching circuit 11 can operate in the second operating state, power transistors Q2 and Q4 can be turned on (e.g., at the same time), and power transistors Q1 and Q3 may be turned off, such that capacitors $C_{in1}$ and $C_{in2}$ can effectively connect in parallel, the voltages across capacitors $C_{in1}$ and $C_{in2}$ are equal. Therefore, capacitors $C_{in1}$ and $C_{in2}$ may not need to be matched to have the same capacitance value; that is, the capacitance values of the two can be the same or different. The conduction path may be Q4-Cr-Lr-Lm ($n_p$)-ground terminal during time interval $t_1\text{-}t_2$, and the input voltage (e.g., input voltage $V_r$) of resonant branch 12 can be zero. In this way, magnetic inductor current $i_m$ can decrease linearly, and primary winding current $i_p$ may be the resonant current, such that the difference between magnetic inductor current $i_m$ and primary winding current $i_p$ can be transmitted to output circuit 13 through secondary winding $n_s$, energy can be transmitted to output circuit 13, and a current may flow through freewheeling diode Do. Repeatedly, as the value of voltage signal $V_r$ may be switched, the values of magnetic inductor current $i_m$ and primary winding current $i_p$ may be cyclically switched, and output circuit 13 can generate the corresponding output electrical signal.

In this example, a part of the power transistors in the voltage switching circuit can be multiplexed, and may form the resonance tank with resonance branch 12, in order to realize resonance control. In the first operating state, power transistors Q1 and Q3 can be multiplexed as the main power switch, and in the second operating state, power transistor Q4 can be multiplexed as the auxiliary power switch, such that the resonant tank may be equivalent to an asymmetric flyback converter for achieving resonance control, and zero voltage switching (ZVS) of the power transistors. Moreover, the voltage stress of the power transistor can be reduced to half of the input voltage Vin/2 by controlling the switching states of the four power transistors and the voltage division of capacitors $C_{in1}$ and $C_{in2}$ while realizing the resonance control, such that the transistor with lower performance parameter(s) can be utilized, and performance requirement(s) of other devices in the circuit can be correspondingly reduced (e.g., turns ratio of the transformer, etc.), thereby reducing the size and cost of the system circuit.

Figure 3A:
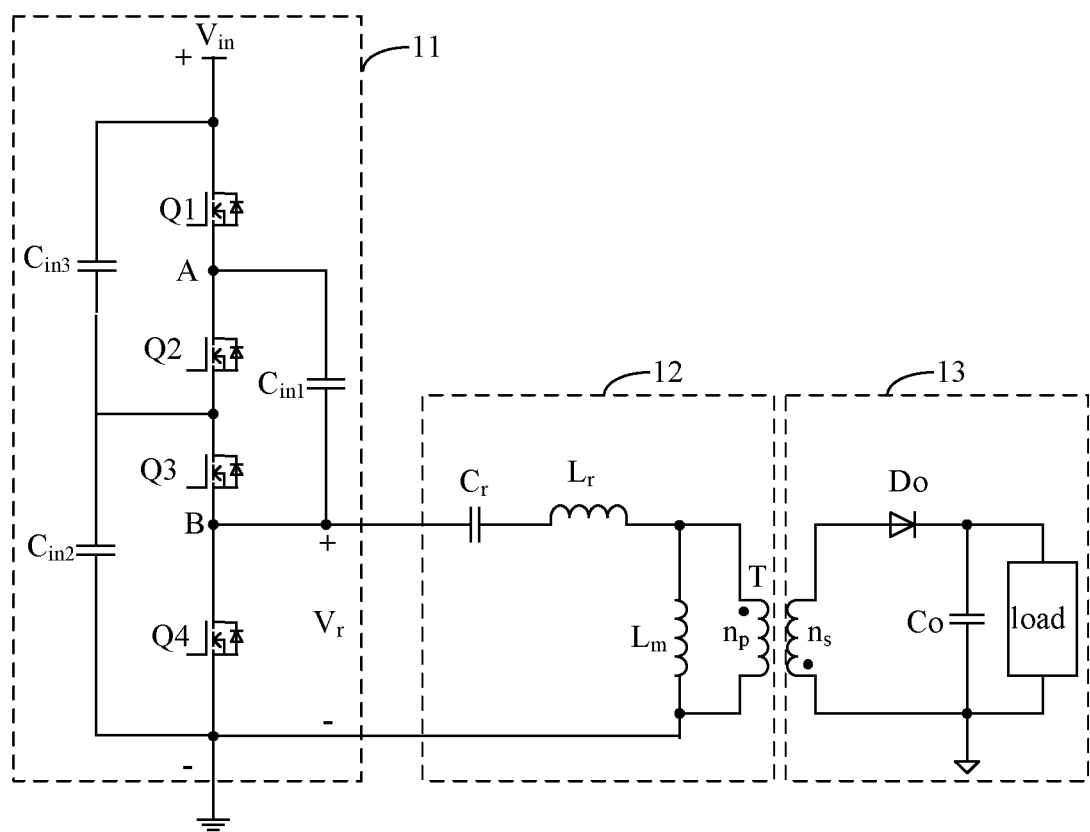
FIG. 3A is shown a schematic block diagram of a third example resonant switching converter, in accordance with embodiments of the present invention.

Referring now to FIG. 3A, shown is a schematic block diagram of a third example resonant switching converter, in accordance with embodiments of the present invention. In this particular example, voltage switching circuit 11 can include a first half-bridge circuit including series-connected power transistors Q1 and Q2, and a second half-bridge circuit including series-connected power transistors Q3 and Q4. The first and second half-bridge circuits can connect in series between two terminals of input voltage V1. Resonant branch 12 can connect between two power terminals of power transistor Q4. Further, voltage switching circuit 11 can include capacitor $C_{in1}$ connected between output terminal A of the first half-bridge circuit and output terminal B of the second half-bridge circuit, capacitor $C_{in2}$ connected between input terminals of the second half-bridge circuit, and capacitor $C_{in3}$ connected between input terminals of the first half-bridge circuit. In each switching period T, the switching states of transistors Q1 and Q3 may be the same, the switching states of transistors Q2 and Q4 may be the same, and the switching states of transistors Q1 and Q2 can be complementary.

Figure 3B:
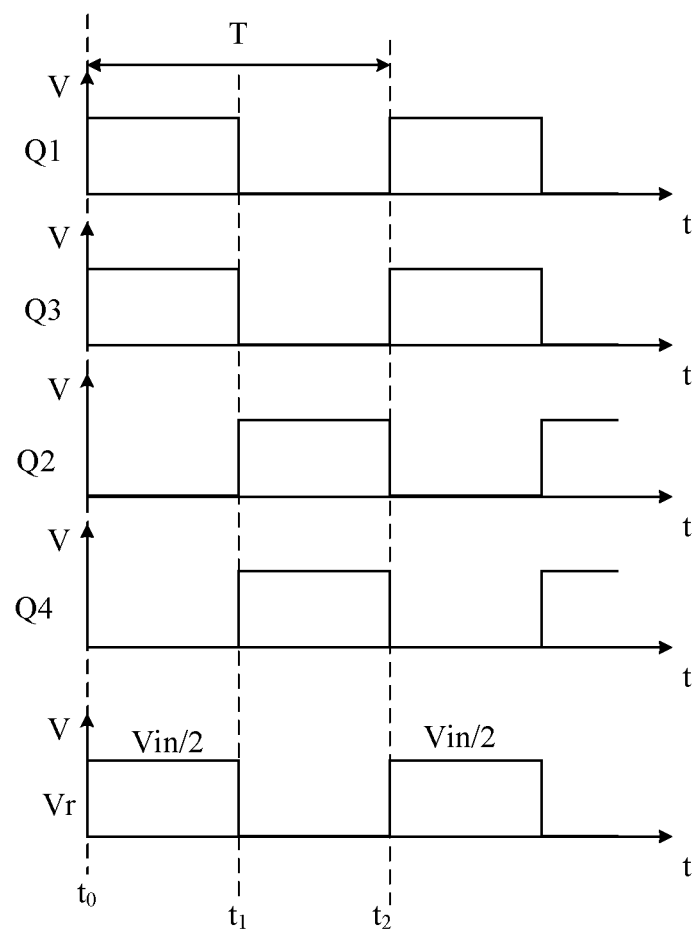
FIG. 3B is shown a waveform diagram of example operation of the resonant switching converter in FIG. 3A, in accordance with embodiments of the present invention.

Referring now to FIG. 3B, shown is a waveform diagram of example operation of the resonant switching circuit in FIG. 3A, in accordance with embodiments of the present invention. During switching period T, voltage switching circuit 11 may have two operating states, time intervals $[t_0-t_1]$ and $[t_1-t_2]$. During time interval $t_0-t_1$, voltage switching circuit 11 can operate in a first operating state, transistors Q1 and Q3 may be turned on, and transistors Q2 and Q4 can be turned off, such that a first conduction path can be Vin-Q1-Cin1-Cr-Lr-Lm-ground terminal, a second conduction path may be Vin-Cin3-Q3-Cr-Lr-Lm-Ground terminal, and a third conduction path can be Cin2-Q3-Cr-Lr-Lm-ground terminal. Further, capacitors $C_{in1}$ and $C_{in3}$ can effectively connect in parallel between the positive terminal of input voltage $V_{in}$ and common node B of power transistors Q3 and Q4, and the voltages across capacitors $C_{in1}$ and $C_{in3}$ may be equal. During this time interval, the input voltage of resonant branch 12 may be voltage Vin/2 across capacitor $C_{in2}$. In this way, magnetic inductor current $i_m$ and primary winding current $i_p$ may both increase linearly, and the values of both can be equal, such that transformer T can store energy, no energy may be transmitted to output circuit 13, and no current may flow through freewheeling diode Do.

During time interval $t_1-t_2$, voltage switching circuit 11 can operate in a second operating state, transistors Q1 and Q3 can be turned off, and transistors Q2 and Q4 may be turned on, such that the conduction path may be Q4-Cr-Lr-Lm-ground terminal. Further, capacitors $C_{in1}$ and $C_{in2}$ can effectively connect in parallel between the negative terminal of input voltage $V_{in}$ and common node A of power transistors Q1 and Q2, and the voltages across capacitors $C_{in1}$ and $C_{in2}$ can be equal. During this time interval, the input voltage of resonant branch 12 can be zero. In this way, magnetic inductor current $i_m$ can decrease linearly, and primary winding current $i_p$ may be the resonant current, such that the difference between magnetic inductor current $i_m$ and primary winding current $i_p$ can be transmitted to output circuit 13 through secondary winding $n_s$, energy can be transmitted to output circuit 13, and a current may flow through freewheeling diode Do. Repeatedly, as the value of input voltage $V_r$ may be switched, the values of magnetic inductor current $i_m$ and primary winding current $i_p$ can be cyclically switched, and output circuit 13 can generate the corresponding output electrical signal.

In this example, the operating states of the power transistors can be controlled in the above two time intervals, capacitors $C_{in1}$, $C_{in2}$, and $C_{in3}$ may not need to be matched to have the same capacitance value, and the capacitance values of the three capacitors can be the same or at least two may not be the same. In this example, a part of the power transistors in the voltage switching circuit can be multiplexed, and may form the resonance tank with resonance branch 12, in order to realize resonance control. In the first operating state, power transistors Q1 and Q3 can be multiplexed as the main power switch, and in the second operating state, power transistor Q4 can be multiplexed as the auxiliary power switch, such that the resonant tank may be equivalent to a asymmetric flyback converter for achieving resonance control, and ZVS of the power transistors can also be achieved. Moreover, the voltage drop of the power transistors can be reduced to half of the input voltage Vin/2 by controlling the switching state of the four power transistors and the voltage division of capacitors $C_{in1}$, $C_{in2}$, and $C_{in3}$, such that the transistor with lower performance parameter(s) can be utilized, and performance requirement(s) of other devices in the circuit can be correspondingly reduced (e.g., turns ratio of the transformer, etc.), thereby reducing the size and cost of the system circuit.

Figure 3C:
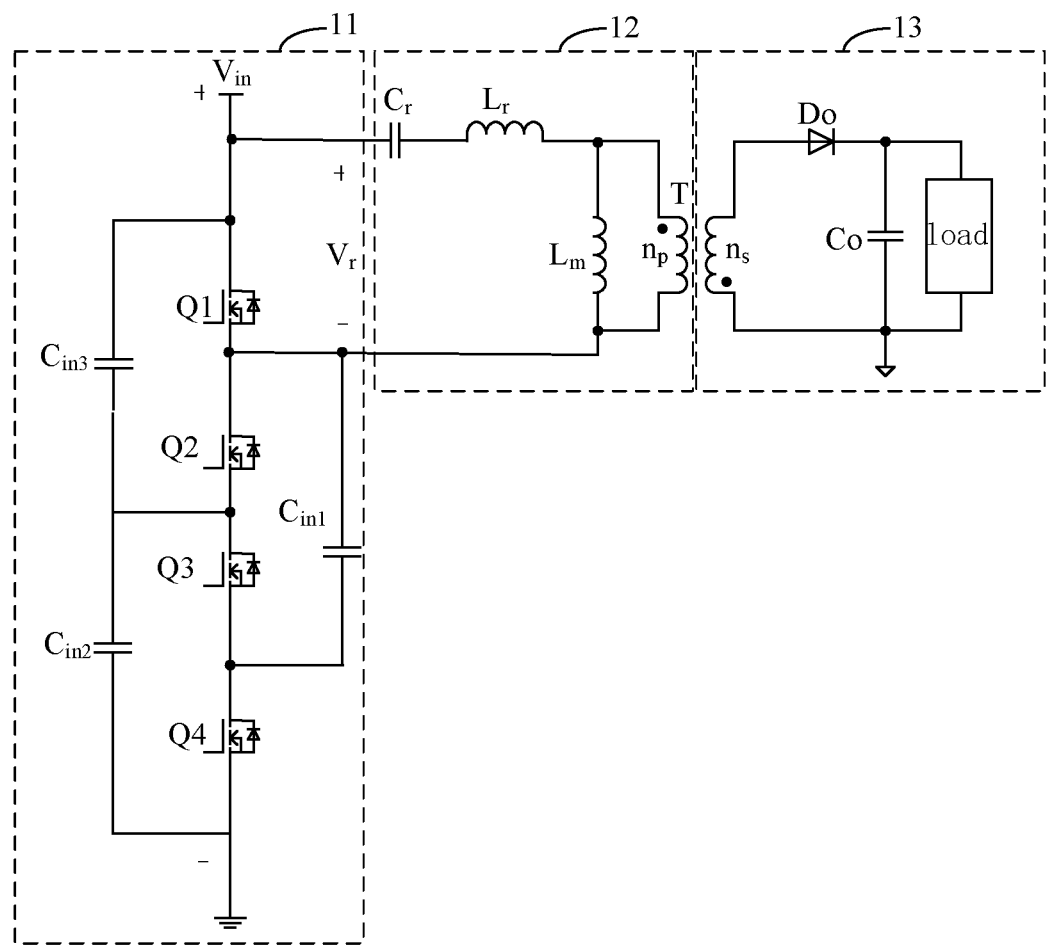
FIG. 3C is shown a waveform diagram of a fourth example resonant switching converter, in accordance with embodiments of the present invention.

Referring now to FIG. 3C, shown is a schematic block diagram of a fourth example resonant switching converter, in accordance with an embodiment of the present invention. In this particular example, the input terminals of resonant branch 12 can be switched between a positive terminal of input voltage $V_{in}$ and the voltage at the common node between power transistors Q1 and Q2, as compared with the resonant switching converter shown in FIG. 3A.

In the above examples, energy can be transferred to the output circuit only in the second operating state, and in some cases the output ripple may be relatively large. Therefore, the resonant switching converter in another example can include N output branches having power transistors for receiving input voltage $V_{in}$ and generating N "second" input voltages, as well as a first capacitor connected between output branches. In this example, each of the output branches can be coupled to a corresponding one of the resonant branches, and each of the resonant branches can be coupled between two power terminals of one power transistor in a corresponding one of the output branches, where N≥2. In the first operating state, the second input voltage may be supplied to the resonant branches through input voltage $V_{in}$ and the first capacitor, or only through the first capacitor. In this example, the multiple resonant branches can transfer energy to the output circuit, such that the output ripple can be reduced. For example, at least one resonant branch can transfer energy to the output circuit of the resonant switching converter at each moment, such that the energy of the output circuit can be continuous, thereby improving the stability of the output electrical signal.

Figure 4A:
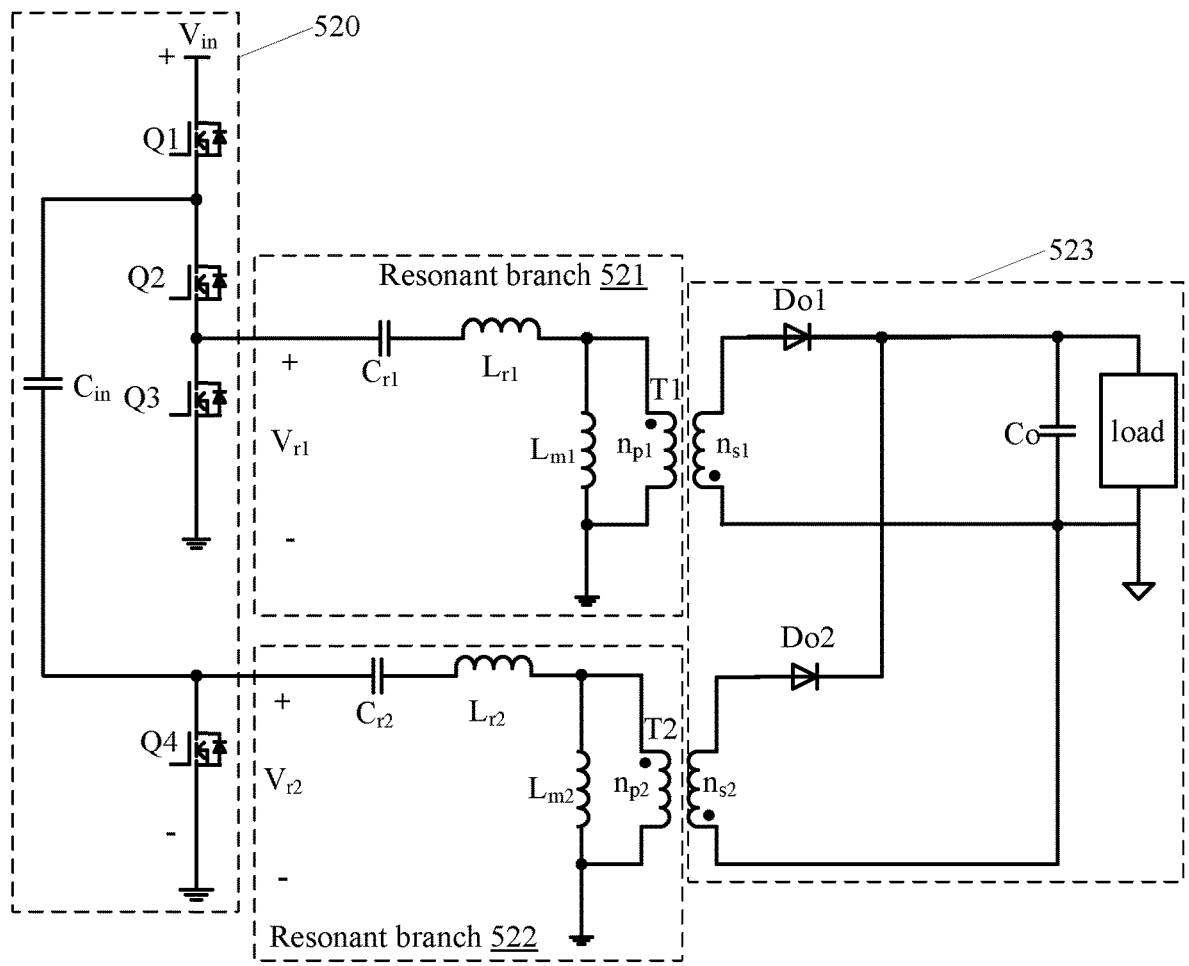
FIG. 4A is shown a schematic block diagram of a fifth example resonant switching converter, in accordance with embodiments of the present invention.

Referring now to FIG. 4A, shown is a schematic block diagram of a fifth example resonant switching converter, in accordance with an embodiment of the present invention. This particular example resonant switching converter can include two resonant branches. Voltage switching circuit 520 of the resonant type switching converter can include two output branches, and may generate the second input voltages to the resonant branches, the number of which can be consistent with the number of resonant branches. For example, each second input voltage may have at least two values, and the value of each second input voltage may not be greater than input voltage $V_{in}$. In this example, voltage switching circuit 520 can include power transistors Q1, Q2, Q3, and Q4 and capacitor $C_{in}$, where the first output branch can include power transistors Q1, Q2, and Q3 connected in series between the two terminals of input voltage $V_{in}$, the second output branch can include power transistors Q1 and Q4 coupled in series between two terminals of input voltage $V_{in}$, and capacitor $C_{in}$ can connect between power transistors Q1 and Q4. Each resonant branch can connect between two power terminals of a corresponding one of the power transistors. For example, resonant branch 521 can connect between the drain and the source of power transistor Q3 in the first output branch, and resonant branch 522 can connect between the drain and the source of power transistor Q4 in the second output branch.

During each switching cycle, the switching states of power transistor Q1 and Q4 may be complementary, and the switching states of power transistor Q2 and Q3 can be complementary. Different operating states can be obtained by controlling the phase difference between power transistor Q2 and Q1 to be 180°, and adjusting duty cycles of power transistors Q1 and Q2. As another example, different operating states may be obtained by adjusting the phase difference between power transistors Q2 and Q1. When in a second operating state, power transistor Q3 or Q4 can be turned on, and the input voltage of the corresponding resonant branch may be switched to zero. When in a first operating state, power transistor Q3 or power transistor Q4 can be turned off, power transistor Q1 or Q2 may be turned on, the input voltage of the corresponding resonant branch can be provided through input voltage $V_{in}$ and capacitor $C_{in}$, or only through capacitor $C_{in}$.

Figure 4B:
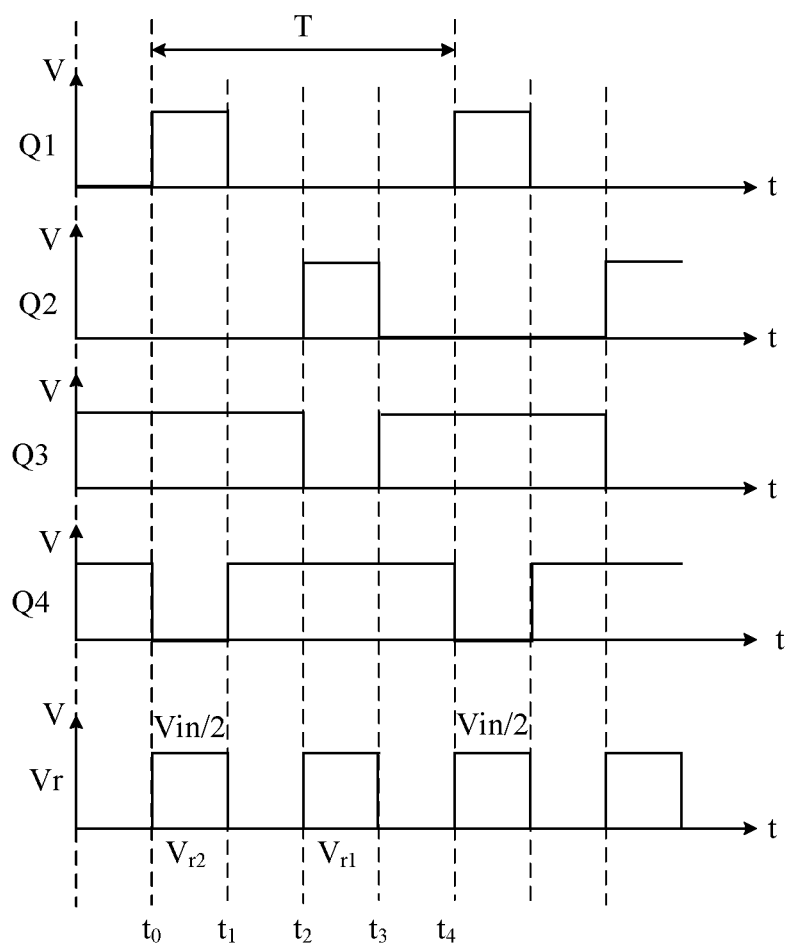
FIG. 4B is shown a waveform diagram of example operation of the resonant switching converter in FIG. 4A in a first control mode, in accordance with embodiments of the present invention.

Referring now to FIG. 4B, shown is a waveform diagram of example operation of the resonant switching converter in FIG. 4A in a first control mode, in accordance with embodiments of the present invention. In the first control mode, the resonant switching converter may have four states during each switching cycle T, namely time intervals [$t_0$-$t_1$], [$t_1$-$t_2$], [$t_2$-$t_3$], and [$t_3$-$t_4$] respectively. During time interval $t_0$-$t_1$, power transistors Q1 and Q3 can be turned on at the same time, and power transistors Q2 and Q4 may be turned off. The first conduction path can be Q3-Cr1-Lr1-Lm1-ground terminal, and "second" input voltage $V_{r1}$ of resonance branch 521 may be zero. The second conduction path can be Vin-Q1-Cin-Cr2-Lr2-Lm2-ground terminal, and input voltage $V_{r2}$ of resonant branch 522 may be the difference between input voltage $V_{in}$ and the voltage across capacitor $C_{in}$; that is, Vin/2. In this way, resonant branch 521 can transmit power to output circuit 523 through transformer T1. Further, magnetic inductor current $i_{m2}$ and primary winding current $i_{p2}$ may both increase linearly, and the values of both can be equal, such that transformer T2 can store energy, and no energy may be transmitted to output circuit 523 through transformer T2.

During time interval $t_1$-$t_2$, power transistors Q3 and Q4 can be turned on at the same time, and power transistors Q1 and Q2 are turned off. The first conduction path may be Q3-Cr1-Lr1-Lm1-ground terminal, and input voltage $V_{r1}$ of resonant branch 521 can be zero. The second conduction path may be Q4-Cr2-Lr2-Lm2-ground terminal, and input voltage $V_{r2}$ of resonant branch 522 can be zero. In this way, resonant branch 521 can transmit power to output circuit 523 through transformer T1 and a current may flow through freewheeling diode Do1 according to the resonant current of the resonant tank and the resonant cycle. In this operating state, resonant branch 522 can transmit power to output circuit 523 through transformer T2.

During time interval $t_2$-$t_3$, power transistors Q2 and Q4 may be turned on at the same time, and power transistors Q1 and Q3 can be turned off. The first conduction path may be Q4-Cin-Q2-Cr1-Lr1-Lm1-ground terminal, and input voltage $V_{r1}$ of resonant branch 521 can be the voltage across capacitor $C_{in}$; that is, Vin/2. The second conduction path may be Q4-Cr2-Lr2-Lm2-ground terminal, and input voltage $V_{r2}$ of resonant branch 522 can be zero. In this way, magnetic inductor current $i_{m1}$ and primary winding current $i_{p1}$ may both increase linearly, and the values of both may be equal, such that transformer T1 can store energy, and no energy may be transmitted to output circuit 523 through transformer T1. In this operating state, resonant branch 522 can transmit power to output circuit 523 through transformer T2 and a current may flow through freewheeling diode Do1 according to the resonant current of the resonant tank and the resonant cycle.

During time interval $t_3$-$t_4$, power transistors Q3 and Q4 can be turned on (e.g., at the same time), and power transistors Q1 and Q2 may be turned off. The first conduction path can be Q3-Cr1-Lr1-Lm1-ground terminal, and input voltage $V_{r1}$ of resonant branch 521 may be zero. The second conduction path can be Q4-Cr2-Lr2-Lm2-ground terminal, and input voltage $V_{r2}$ of resonant branch 522 may be zero. In this way, resonant branch 521 can transmit power to output circuit 523 through transformer T1 according to the resonant current of the resonant tank and the resonant cycle. Further, resonant branch 522 can transmit power to output circuit 523 through transformer T1 according to the resonant current of the resonant tank and the resonant cycle.

Figure 4C:
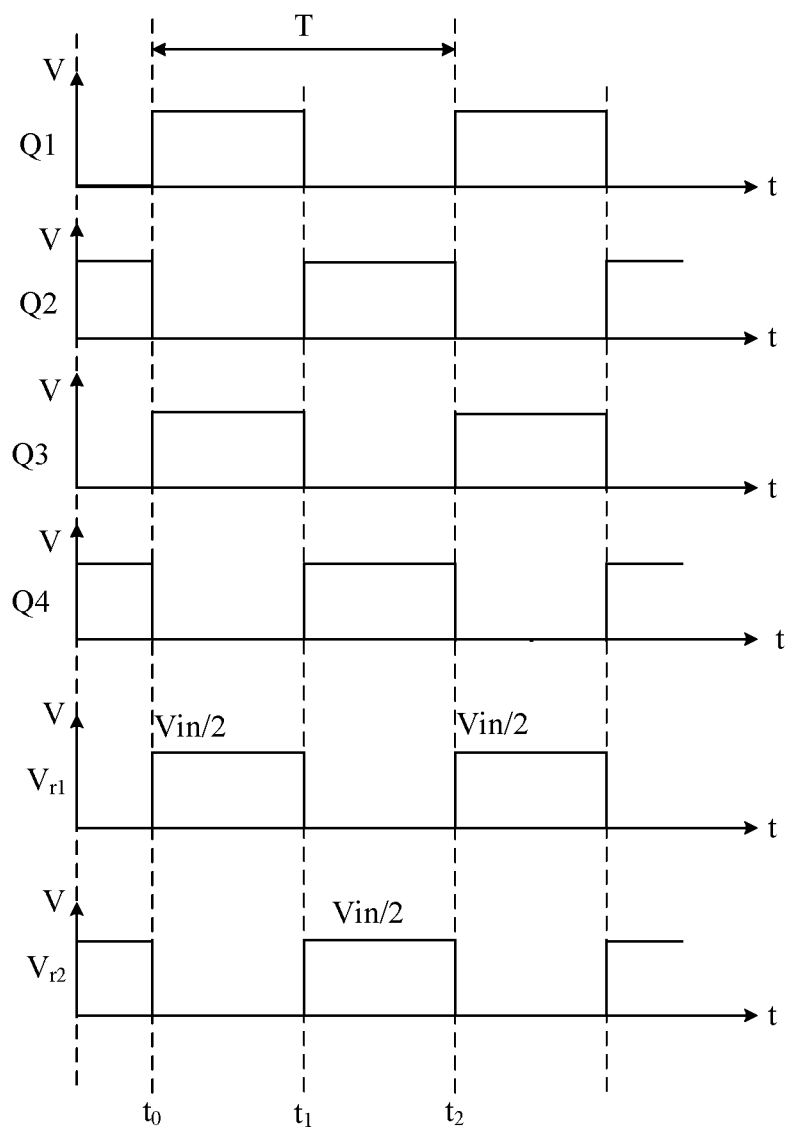
FIG. 4C is shown a waveform diagram of example operation of the resonant switching converter in FIG. 4A in a second control mode, in accordance with embodiments of the present invention.

Referring now to FIG. 4C, shown is a waveform diagram of example operation of the resonant switching converter in FIG. 4A in a second control mode, in accordance with embodiments of the present invention. In the second control mode, the resonant switching converter may have two different states during each switching cycle T, namely time intervals [$t_0$-$t_1$], [$t_1$-$t_2$], [$t_2$-$t_3$], and [$t_3$-$t_4$]. During each switching cycle, the switching states of power transistors Q1 and Q4 can be complementary, the switching states of power transistors Q2 and Q3 may be complementary, and the switching states of power transistors Q1 and Q3 can be the same.

During time interval $t_0$-$t_1$, power transistors Q1 and Q3 may be turned on (e.g., at the same time), and power transistors Q2 and Q4 are turned off. The first conduction path can be Q3-Cr1-Lr1-Lm1-ground terminal, and input voltage $V_{r1}$ of resonance branch 521 may be zero. The second conduction path can be Vin-Q1-Cin-Cr2-Lr2-Lm2-ground terminal, and input voltage $V_{r2}$ of resonant branch 522 may be the difference between input voltage $V_{in}$ and the voltage across capacitor $C_{in}$; that is, Vin/2. In this way, resonant branch 521 can transmit power to output circuit 523 through transformer T1. Further, magnetic inductor current $i_{m2}$ and primary winding current $i_{p2}$ may both increase linearly, and the values of both may be equal, such that transformer T2 can store energy, and no energy may be transmitted to output circuit 523 through transformer T2.

During time interval $t_1$-$t_2$, power transistors Q2 and Q4 can be turned on at the same time, and power transistors Q1 and Q3 may be turned off. The first conduction path can be Q4-Cin-Q2-Cr1-Lr1-Lm1-ground terminal, and input voltage $V_{r1}$ of resonant branch 521 may be the voltage across capacitor $C_{in}$; that is, Vin/2. The second conduction path can be Q4-Cr2-Lr2-Lm2-ground terminal, and input voltage $V_{r2}$ of resonant branch 522 may be zero. In this way, magnetic inductor current $i_{m1}$ and primary winding current $i_{p1}$ may both increase linearly, and the values of both may be equal, such that transformer T1 can store energy, and no energy may be transmitted to output circuit 523 through transformer T1. In this operating state, resonant branch 522 can transmit power to output circuit 523 through transformer T2 according to the resonant current of the resonant tank and the resonant cycle, and a current may flow through freewheeling diode Do2.

In the second operating mode, when power transistor Q3 may be turned on, the input voltage of resonant branch 521 can be switched to zero, and when power transistor Q4 is turned on, the input voltage of resonant branch 522 can be switched to zero. In the first operating mode, when power transistor Q3 or Q4 is turned off, power transistor Q1 or Q2 can be turned on, such that the input voltage of resonant branch 521 may be provided through capacitor $C_{in}$, and the input voltage of resonant branch 522 can be provided through input voltage $V_{in}$ and capacitor $C_{in}$.

In this example, the number of the second input voltages (e.g., $V_{r1}$, $V_{r2}$, etc.) generated by the voltage switching circuit may be consistent with the number of resonant branches, in order to provide the input voltages to the resonant branches. The multiple resonant branches can transfer energy to the output circuit, such that output ripple can be reduced. For example, at least one resonant branch can transfer energy to the output circuit of the resonant switching converter at each moment, such that the energy of the output circuit can be continuous, thereby improving the stability of the output electrical signal.

In particular embodiments, a part of the power transistors in the voltage switching circuit can be multiplexed, and may form the resonance tank with the resonance branch, in order to realize resonance control. Moreover, the voltage drop of the power transistors can be reduced, such that the transistors with lower performance parameter can be utilized, and performance requirement(s) of other devices in the circuit can be correspondingly reduced (e.g., turns ratio of the transformer, etc.), thereby reducing the he size and cost of the system circuit.

For example, the isolated flyback converter topology can be employed, the circuit structure of the voltage switching circuit can be a four-switch voltage conversion structure, and the voltage division ratio of the input voltage may be ½. However, other types of topologies can be applied, such as an asymmetric half-bridge forward converter, and other structures of the voltage switching circuit, such as a voltage conversion structure with six or eight switches, and voltage divider capacitors or other types of suitable voltage conversion structures, can also be employed in certain embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A resonant switching converter, comprising:
   a) a voltage switching circuit configured to receive a first input voltage, and to generate a second input voltage that is correspondingly provided to a resonant branch coupled to said voltage switching circuit;
   b) wherein when said voltage switching circuit is in a first operating state, said second input voltage provided to said resonant branch is less than said first input voltage;
   c) wherein when said voltage switching circuit is in a second operating state, said second input voltage correspondingly provided to said resonant branch is zero;
   d) wherein said voltage switching circuit comprises N half-bridge circuits coupled in series between two terminals of said first input voltage, wherein each half-bridge circuit comprises two power transistors coupled in series, wherein said resonant branch is coupled to a corresponding one of output terminals of said N half-bridge circuits, and wherein N is a positive integer of at least two;
   e) N−1 first capacitors, each of which being coupled between output terminals of two adjacent half-bridge circuits; and
   f) N−1 second capacitors respectively coupled between two input terminals of a corresponding one of a second to an N-th half-bridge circuit.

2. The resonant switching converter of claim 1, wherein a resonant tank of said resonant switching converter is formed with at least one power transistor of said voltage switching circuit and said resonant branch.

3. The resonant switching converter of claim 1, wherein said first and second operating states alternate during each switching cycle.

4. The resonant switching converter of claim 1, wherein said resonant branch is coupled between two power terminals of a 2N-th power transistor of said N-th half-bridge circuit.

5. The resonant switching converter of claim 1, wherein:
   a) when in said first operating state, said resonant branch multiplexes N power transistors in said N half-bridge current units as a main power transistor; and
   b) when in said second operating state, said resonant branch multiplexes said power transistor that is coupled between said input terminals of said resonant branch as an auxiliary power transistor, in order to form said resonant switching converter.

6. The resonant switching converter of claim 1, wherein said voltage switching circuit comprises 2N power transistors, and said second input voltage is consistent with 1/N of said first input voltage.

7. The resonant switching converter of claim 1, wherein when in said first operating state, power transistors with odd numbers in 2N series power transistors are in on states, and power transistor with even numbers in 2N series power transistors are in off states.

8. The resonant switching converter of claim 1, wherein said voltage switching circuit comprises N second capacitors respectively coupled between two input terminals of a corresponding one of half-bridge circuits.

9. The resonant switching converter of claim 8, wherein said resonant branch is coupled between two power terminals of a 2N-th power transistor of said N-th half-bridge circuit.

10. The resonant switching converter of claim 8, wherein said resonant branch is coupled between two power terminals of a first power transistor of said first half-bridge circuit.

11. The resonant switching converter of claim 8, wherein in said first operating mode, power transistors with odd numbers in 2N series power transistors are in on states, and power transistor with even numbers in 2N series power transistors are in off states.

12. The resonant switching converter of claim 1, wherein said voltage switching circuit comprises:
  a) a first output branch having first, second, and third power transistors coupled in series between two terminals of said first input voltage; and
  b) a second output branch having said first power transistor, a first capacitor, and a fourth power transistor coupled in series between two terminals of said first input voltage.

13. A resonant switching converter, comprising:
  a) a voltage switching circuit configured to receive a first input voltage, and to generate a second input voltage that is correspondingly provided to a first resonant branch coupled to said voltage switching circuit; and
  b) N resonant branches comprising said first resonant branch and a second resonant branch;
  c) wherein when said voltage switching circuit is in a first operating state, said second input voltage provided to said first resonant branch is less than said first input voltage;
  d) wherein when said voltage switching circuit is in a second operating state, said second input voltage correspondingly provided to said first resonant branch is zero;
  e) wherein each of said N resonant branches is coupled between two power terminals of a corresponding one of a plurality of power transistors having a power terminal thereof coupled to a ground terminal in said voltage switching circuit; and
  f) wherein at least a corresponding one of said plurality of power transistors is turned on in said second operating state.

14. The resonant switching converter of claim 13, wherein said second input voltages provided by said voltage switching circuit to said N resonant branches are 1/N of said first input voltage in said first operating state.

15. The resonant switching converter of claim 14, wherein power is transmitted to an output circuit of said resonant switching converter through said N resonant branches in said second operating state.

16. The resonant switching converter of claim 14, wherein by controlling switching states of said plurality of power transistors, said second input voltage is provided to said N resonant branches through said first input voltage and a first capacitor, or only through said first capacitor.

17. The resonant switching converter of claim 13, wherein said voltage switching circuit comprises:
  a) a first output branch having first, second, and third power transistors coupled in series between two terminals of said first input voltage;
  b) a second output branch having said first power transistor, a first capacitor, and a fourth power transistor coupled in series between two terminals of said first input voltage; and
  c) wherein said first resonant branch is coupled between two power terminals of said third power transistor, and said second resonant branch is coupled between two power terminals of said fourth power transistor.

18. The resonant switching converter of claim 17, wherein switching states of said first and fourth power transistors are complementary, and switching states of said second and third power transistors are the same.

19. The resonant switching converter of claim 17, wherein power transmitted to said output circuit of said resonant switching converter by said N resonant branches is regulated by adjusting phase difference between said first and second power transistors, or by adjusting duty cycles of said first and second power transistors.

20. The resonant switching converter of claim 17, wherein said voltage switching circuit comprises N output branches, each of said output branch is coupled between said first input voltage and a ground, and being configured to provide said second input voltage to a corresponding one of said N resonant branches.

* * * * *